Dec. 26, 1950     C. A. GOSSETT     2,535,201

MAGNETICALLY ACTUATED DIRECTION INDICATOR

Filed Dec. 20, 1948

CHARLES A. GOSSETT
INVENTOR.

BY James D. Givnan
ATT'Y

Patented Dec. 26, 1950

2,535,201

UNITED STATES PATENT OFFICE 2,535,201

MAGNETICALLY ACTUATED DIRECTION INDICATOR

Charles A. Gossett, Portland, Oreg.

Application December 20, 1948, Serial No. 66,391

1 Claim. (Cl. 33—222)

This invention relates to improvements in magnetically actuated direction indicators.

It is one of the principal objects of the invention to provide an instrument of this character with which a user may by the sense of touch, determine the position of the magnetic element, or pointer, in relation to the points of the compass. The invention is particularly useful at night in the absence of any illumination.

A further object is the provision of markers in the form of nodules arranged in correspondence with the points of a compass so that an operator may quickly and conveniently determine the position of the magnetic element of the compass in relation to the directional points.

These and other objects will appear as my invention is more fully hereinafter described in the following specification illustrated in the accompanying drawing and finally pointed out in the appended claim.

Figure 1:
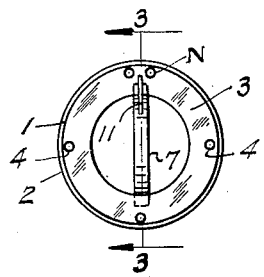
Figure 1 is a top plan view of a direction indicator made in accordance with my invention.
Figure 2:
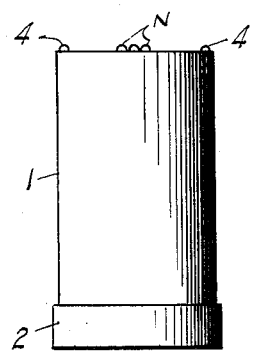
Figure 2 is a side elevation of Figure 1.
Figure 3:
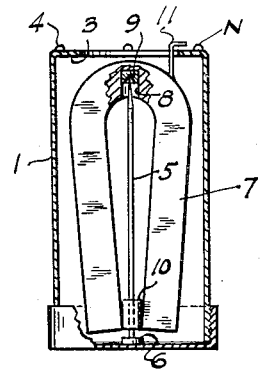
Figure 3 is a sectional side elevation taken approximately along the line 3—3 of Figure 1.

Referring now more particularly to the drawing:

The main body of the invention consists of a cylinder 1 closed by a screw-cap 2 at its bottom end and flanged inwardly as at 3 at its top end. The top surface of the flange is provided with nodules or projections 4 arranged to correspond with the four points of a compass representing north, south, east, and west. To distinguish the north point of the compass from the other points I provide two spaced-apart nodules indicated at N.

To the center of the bottom wall or screw-cap 2 I secure a vertical supporting pin 5 by means of a boss 6 into which the pin may be threaded or otherwise secured. The upper end of the pin is pointed as shown to rotatably support a permanent magnet 7 by means of a bore 8 and a jewel bearing 9 disposed within the bore and recessed as shown to rest upon the point of the pin. Between the opposite ends of the magnet 7 I secure a collar 10 loosely embracing the pin so as to allow freedom of rotation of the magnet and at the same time keep it substantially in alignment with the pin.

To one side of the top end of the magnet I secure, by any suitable means, such as soldering or the like a pin 11 whose uppermost end extends slightly above and across the rim 3 at the top end of the cylinder 1 for convenient contact with the finger of the user.

The pin 11 is on the side of the magnet corresponding with the south pole thereof so that that side of the magnet will be attracted to the magnetic north of the earth.

When the device is set in a vertical position the magnet, of course, will pivot about the pin 5 until the side of the magnet carrying the pin 11 comes to rest in alignment with the magnetic north. By finger pressure on the pin the user may hold the magnet in this position and then rotate the cylinder with respect to the magnet until the nodules N are positioned on each side of the pin 11, whereupon he can then determine the location of the east, south, and west points of the compass by contacting the corresponding nodules 4.

It is to be understood, of course, that all parts of the device, except the magnet itself, are to be made of non-magnetic material such as brass, bronze, aluminum or the like.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A magnetically actuated direction indicator comprising in combination an elongated cylindrical vertical housing closed at its bottom end and flanged inwardly at its upper end, a vertical pin secured to the bottom end of the housing and pointed at its upper end, a vertically disposed inverted U-shaped magnet disposed within said housing, a jewel bearing secured to the closed or upper end of said magnet and rotatably mounted on the pointed end of said vertical pin, a collar surrounding said pin and secured between the open bottom ends of said magnet, an indicating pin secured to one side of said magnet at the upper end thereof and extending upwardly and outwardly over said flanged upper end of the housing and adapted for contact with a finger of the user, and nodules formed about said flanged end of the housing corresponding with the points of a compass whereby the user may determine by the sense of touch the location of said indicating pin with respect to said nodules and the points of a compass represented thereby.

CHARLES A. GOSSETT.

REFERENCES CITED

The following references are of record in the file of this patent:

FOREIGN PATENTS

| Number | Country | Date |
|---|---|---|
| 25,506 | Great Britain | Nov. 7, 1913 |
| 305,250 | Germany | Apr. 18, 1918 |
| 589,531 | Germany | Dec. 13, 1933 |